(12) United States Patent
Thirumalai et al.

(10) Patent No.: US 8,418,150 B2
(45) Date of Patent: *Apr. 9, 2013

(54) ESTIMATING IMPACT OF CONFIGURATION CHANGES

(75) Inventors: Govindarajan Thirumalai, Bangalore (IN); Praveen Arora, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 12/417,938

(22) Filed: Apr. 3, 2009

(65) Prior Publication Data

US 2010/0257513 A1  Oct. 7, 2010

(51) Int. Cl.
    *G06F 9/44* (2006.01)
(52) U.S. Cl. ............... 717/134; 711/154; 717/124
(58) Field of Classification Search ............... 707/2
    See application file for complete search history.

(56) References Cited

U.S. PATENT DOCUMENTS

| | | |
|---|---|---|
| 5,440,735 A | 8/1995 | Goldring |
| 5,448,739 A | 9/1995 | Jacobson |
| 5,960,436 A | 9/1999 | Chang et al. |
| 6,041,344 A | 3/2000 | Bodamer et al. |
| 6,094,684 A | 7/2000 | Pallmann |
| 6,145,121 A | 11/2000 | Levy et al. |
| 6,167,405 A | 12/2000 | Rosensteel, Jr. et al. |
| 6,236,997 B1 | 5/2001 | Bodamer et al. |
| 6,253,228 B1 | 6/2001 | Ferris et al. |
| 6,629,313 B1 | 9/2003 | Rowe et al. |
| 6,769,054 B1 | 7/2004 | Sahin et al. |
| 6,775,826 B1 | 8/2004 | Zahavi et al. |
| 6,813,731 B2 | 11/2004 | Zahavi et al. |
| 6,877,095 B1 | 4/2005 | Allen |
| 7,076,480 B2 | 7/2006 | Scardo et al. |
| 7,194,761 B1 | 3/2007 | Champagne |
| 7,415,522 B2 | 8/2008 | Kaluskar et al. |
| 8,024,299 B2 | 9/2011 | Dias et al. |

(Continued)

FOREIGN PATENT DOCUMENTS

| | | |
|---|---|---|
| EP | 1 610 238 A2 | 12/2005 |
| WO | 02/097664 A1 | 12/2002 |
| WO | 03/005202 A1 | 1/2003 |
| WO | 03/009139 A1 | 1/2003 |

OTHER PUBLICATIONS

5 Schema Objects. Oracle Databse Concepts. 10g Release 1 (10.1), Part No. B10743-01 [online]. [retrieved on May 11, 2012]. Retrieved from the Internet: <URL: http://oracle-docs.dartmouth.edu/dba-docs/server.101/b10743/schema.htm>.

(Continued)

*Primary Examiner* — Don Wong
*Assistant Examiner* — Deric Ortiz
(74) *Attorney, Agent, or Firm* — Kilpatrick Townsend & Stockton LLP (57) ABSTRACT

Tools and techniques for providing an assessment of a prospective configuration change in a production database environment. In some cases, tools may record a series of transactions in a production database. This set of transactions can then be replayed by the tools in a test database, both before and after the configuration change has been performed. The performance of the workload in this test environment can be measured under both conditions (pre-change and post-change) to provide insight into a performance impact that might result from implementing the configuration change in the production environment.

23 Claims, 5 Drawing Sheets

U.S. PATENT DOCUMENTS

| | | | |
|---|---|---|---|
| 2001/0020237 | A1 | 9/2001 | Yarnall et al. |
| 2003/0172091 | A1 | 9/2003 | Norcott |
| 2004/0003266 | A1 | 1/2004 | Moshir et al. |
| 2004/0015600 | A1 | 1/2004 | Tiwary et al. |
| 2004/0221115 | A1* | 11/2004 | Sahin et al. .................. 711/154 |
| 2005/0038849 | A1 | 2/2005 | Kaluskar et al. |
| 2005/0055383 | A1 | 3/2005 | Dias et al. |
| 2005/0071838 | A1 | 3/2005 | Hatasaki |
| 2005/0131879 | A1 | 6/2005 | Ghosh et al. |
| 2005/0131881 | A1 | 6/2005 | Ghosh et al. |
| 2005/0186975 | A1 | 8/2005 | Yach et al. |
| 2006/0248116 | A1 | 11/2006 | Sobel |
| 2007/0033586 | A1 | 2/2007 | Hirsave et al. |
| 2011/0295801 | A1 | 12/2011 | Dias et al. |

OTHER PUBLICATIONS

6 Application Builder Concepts. Oracle HTML DB User's Guide. Release 1.5, Part No. B10992-01 [online]. [retrieved on May 11, 2012]. Retrieved from the Internet: <URL: http://oracle-docs.dartmouth.edu/dba-docs/l0gdoc/appdev.101/b10992/mvl_fund.htm>.

Ayan, Resat Otan. Methodologically Upgrading a Production System. SANS Institute, InfoSec Reading Room [online], [retrieved on Dec. 16, 2008]. Retrieved from the Internet <URL:https://www2.sans.org/reading_room/whitepapers/sysadmin/1097.php>.

Big4Guy. IT Environment Instances: Test Development Patch Production. [online], [retrieved on Dec. 16, 2008]. Retrieved from the Internet <URL: http://big4guy.com/index.php/2006/09/22/it_environment_instances_test_developmen>.

Chan, Jason. Creating a Testing Environment for Hotfixes and Patches. Ask the Enterprise Desktop Expert: Questions & Answers [online], [retrieved on Dec. 16, 2008]. Retrieved from the Internet <URL:http://searchenterprisedesktop.techtarget.com/expert/KnowledgebaseAnswer/0,289625,sid192_gci 1 123515.,00.html#>.

Claims in PCT/US2007/081966 published May 2, 2008, 6 pages.

Dias et al. Automatic Performance Diagnosis and Tuning in Oracle. CIDR Conference 2005 [online], [retrieved May 11, 2012]. Retrieved from the Internet <URL:http://oracle.sitecelerate.com/technetwork/database/focus-areas/manageability/cidr-addm-134903.pdf>.

Dunagan et al. Towards a Self-Managing Software Patching Process Using Black-Box Persistent-State Manifests. Autonomic Computing, Proceedings 2004 [online], [retrieved on Dec. 16, 2008]. Retrieved from the Internet <URL: http://ieeexplore.ieee.org/Xplore/login.jsp?url=iel5/9121/28917/01301353.pdf?temp=x>.

European Patent Office. International Search Report in PCT/US2007/081966 mailed Mar. 11, 2008.

Holcomb, Jason. Virtualization in the SCADA World: Part 3—Testing, SCANApedia [online], [retrieved on Dec. 16, 2008]. Retrieved from the Internet <URL:http://www.digitalbond.com/index.php/2008/02/07/virtualization-in-the-scada-world-part-3/>.

VMware. VMware P2V Assistant: Enterprise-class Tool for Physical to Virtual Machine Migration [online], [retrieved on Dec. 16, 2008]. Retrieved from the Internet <URL:http://www.nexstor.co.uk/prod_pdfs/VMware%20P2V%20Assistant.pdf>.

Wise Solutions. Wise Package Studio 7: Professional Edition. [online], [retrieved on Dec. 16, 2008]. Retrieved from the Internet <URL: http://www.componentsource.com/products/wise-package-studio-professional/index.html>.

* cited by examiner

ESTIMATING IMPACT OF CONFIGURATION CHANGES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to software configuration, and more particularly, to tools and techniques for estimating an impact of a proposed configuration change in a software environment.

BACKGROUND

Configuration changes in the software industry are common. Many software programs are upgraded regularly and incrementally, offering new features and/or fixing imperfections (or "bugs") in prior versions. In some cases, the update might require the installation of an entirely new version of the product, while in other cases, a patch can be applied to an existing installation of the product to provide the new or improved functionality. Software vendors have an interest in encouraging users to update that vendor's software, both to generate revenue through additional sales and to reduce customer dissatisfaction with, and service calls resulting from, problems related to down-level (i.e., older versions of) software. Additionally, as the hardware on which that software runs becomes outdated and/or unreliable, the hardware may need to be upgraded or replaced. In some cases, newer (or different) versions of software may be available to take advantage of the features of newer hardware. In addition, many vendors now provide "software as a service," running applications for a customer in the vendor's environment; an example is Oracle On Demand™, available commercially from Oracle Corporation. Such software-as-a-service vendors often desire to keep this environment updated with current (and properly-patched) versions of the installed software, for marketing purposes, to reduce support costs, and for myriad other reasons.

Software users, and especially business users, however, are often reluctant to adopt software patches or other upgrades. They are often equally, if not more, reluctant to introduce hardware configuration changes. From the user's perspective, if the existing installation works (even if not optimally), the user often sees no need to risk breaking the system with an untried upgrade of hardware or software.

This concern is particularly acute in business settings that employ complex enterprise applications. As used herein, the term "enterprise application" is used to refer to any software application, or suite of applications, that perform business functions, such as accounting, payroll, resource planning, customer relations management, and/or the like. Such applications, include, merely by way of example, the Oracle E-Business Suite™, Oracle Fusion™, PeopleSoft Enterprise™, JD Edwards Enterpriseone™, JD Edwards World™, and Siebel CRM™, all of which are commercially available from Oracle Corporation. These enterprise applications typically are database-driven, meaning that they employ a database (often managed by a relational database management system or "RDBMS," such as Oracle Database 11g™, commercially available from Oracle Corporation). Businesses usually view these applications as mission-critical and therefore are reluctant to make any changes, either to the applications themselves or to the environment (which can include, without limitation, the application itself, the database and/or RDBMS, the operating system, and/or the hardware) in which the application runs, for fear that the configuration change will result in costly system downtime, or even in reduced system performance, which can become equally costly over time. Accordingly, these business users often decline to install patches or upgrades (to either the application or any other component of the application's environment), even when the patches or upgrades offer to dramatically improve system performance. For similar reasons, such business users often refuse to upgrade to current versions of software, resulting in lost sales for the software vendor and a missed opportunity for the user to enjoy increased functionality. Likewise, a customer of a software-as-a-service vendor might refuse to allow the vendor to patch or upgrade the vendor's application environment, which puts the vendor in the difficult position of having multiple customers with conflicting demands (some customers demanding a patch and others refusing it) and/or having to support multiple, disparate environments.

It would be useful if there were a way to ensure users that a prospective patch or upgrade would not result in performance issues.

BRIEF SUMMARY

A set of embodiments provides tools and techniques for providing an assessment of a prospective configuration change in a database environment. In accordance with some embodiments, these tools can be used in a database environment, and the tools may record a series of transactions that are performed in a database. These transactions, in one aspect, may be generated by activity in an enterprise application that employs the database to store data. This set of transactions, or "workload," can then be replayed by the tools in a test database, both before and after the proposed configuration change (such as a patch, update, and/or the like) has been performed. The performance of the workload in this test environment can be measured under both conditions (pre-change and post-change) to provide insight into a performance impact of the change.

Merely by way of example, certain embodiments may be configured to measure the SQL performance of the database workload in the test environment. Rather than merely measuring workload and/or SQL performance, however, other embodiments can (additionally and/or alternatively) measure a variety of other parameters in order to estimate a performance impact of a configuration change. Merely by way of example, certain tools may measure performance indicators such as database transactions per second, CPU and/or memory usage, response times (e.g., $90^{th}$ percentile response time), memory swapping, database swaps, and/or the like.

In another set of embodiments, the tools and techniques can provide an estimate of the performance impact of the prospective configuration change to the database environment, based on a comparison of performance data gathered during the replay of the set of transactions. In this way, a user of the database environment can be assured that the proposed configuration change will not have an adverse impact on the performance of the database environment. Alternatively and/or additionally, certain embodiments can provide the ability to detect code regressions (or "bugs") in the prospective update or patch that might cause performance problems generally (and not merely on the specific database environment for which the configuration change is contemplated). As another feature of certain embodiments, these tools can be used to estimate and/or demonstrate performance enhancements that may result from the proposed configuration change. This feature can provide a valuable sales and/or marketing tool.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

One set of embodiments, for example, provides methods, including without limitation methods of estimating an impact (e.g., an impact on performance) of a configuration change in a database environment. One exemplary method comprises providing a production database in a production environment and performing, with an enterprise application, a plurality of transactions to generate a production dataset in the production database. The method, in an embodiment, further comprises recording (in the production database) the plurality of transactions, perhaps using a database application testing program.

Some embodiments further comprise providing a first test database in a first test environment. In some cases, the first test environment may have a configuration similar to (although not necessarily identical to) the production environment; for example, the first test environment might employ a database (and/or RDBMS) with similar version, table structure, etc., to the production database. The method, then, may further comprise replaying the plurality of transactions in the first test database within the first test environment to produce a first test dataset and/or measuring a first set of one or more performance indicators associated with replaying the plurality of transactions in the first test database. In an aspect, the first set of one or more performance indicators might comprise at least one performance indicator other than SQL performance.

In accordance with further embodiments, the method comprises providing a second test database in a modified test environment. In one aspect, the modified test environment may have been modified from the first test environment by applying a software patch to at least one component of the first test environment. The plurality of transactions might be replayed in the second test database within the modified test environment to produce a second test dataset. Further, the method, in some cases, comprises measuring a second set of one or more performance indicators associated with replaying the plurality of transactions in the second test database; this second set of one or more performance indicators might include at least one performance indicator other than SQL performance, similar to the first set of one or more performance indicators. In fact, in some cases, the second set of performance indicators comprises the same indicators as the first set (although, of course, the values of the respective indicators in each set may differ). Accordingly, the method might further comprise comparing one or performance indicators in the first set of performance indicators with one or more performance indicators in the second set of performance indicators.

In certain embodiments, the method further comprises estimating an impact of applying the software patch to the production environment. In some cases, this estimation is based at least in part on replaying the plurality of transactions in the first test database and the second test database and/or on a comparison of one or more performance indicators in the first set of performance indicators with one or more performance indicators in the second set of performance indicators. Merely by way of example, if the respective performance indicators demonstrate that the second test environment performed better than the first test environment (e.g., in terms of CPU usage, database swaps, and/or any other suitable criteria), it might be estimated that applying the patch to the production system would have a positive impact on the performance of the production environment.

A method in accordance with another set of embodiments comprises recording, in a first database, a plurality of transactions, and/or replaying the plurality of transactions in at least one test database. The method might further comprise measuring at least one set of one or more performance indicators associated with replaying the plurality of transactions in the at least one test database; in an aspect of some embodiments, each set of one or more performance indicators comprising at least one performance indicator other than structured query language ("SQL") performance.

In some cases, the plurality of transactions might be replayed in two or more test databases, and/or the set of performance indicator(s) might be measured in each database. In other cases, the first database might be a database in a production environment, and/or the plurality of transactions might be replayed in only one test database (which might reside in a test environment that has been configured with a modification proposed for the production database), and the set of performance indicators might be measured in the production database and/or the test database.

The method, then might further comprise estimating an impact of a configuration change in a production database environment based at least in part on the at least one set of one or more performance indicators. Merely by way of example, if the set of transactions were replayed in two (or more) test databases with different configurations (e.g., one configuration to model the current production system and one configuration to model a propose change to the configuration of the production system), the set of performance indicators measured in each test database might be compared to estimate an impact of the configuration change on the production system.

A method in accordance with yet another set of embodiments comprises recording, in a production database in a production environment, a plurality of transactions. The method, in some embodiments, further comprises providing a first test database in a first test environment and/or providing a second test database in a modified test environment. (In some cases, the first test database and the second test database are the same database; for example, the first test environment might model the current production environment, and providing the second test database might comprise modifying the first test environment to model a proposed modification of the configuration of the production environment.)

The method, in accordance with certain embodiments, comprises replaying the plurality of transactions in the first test database within the first test environment to produce a first test dataset and/or replaying the plurality of transactions in the second test database within the modified test environment to produce a second test dataset. The method might further comprise estimating an impact of a configuration change in the production environment, based (perhaps) at least in part on replaying the plurality of transactions in the first test database and the second test database. Merely by way of example, one or more respective performance indicators measured during the replay of the transactions in each test database might be compared to determine a performance impact of the configuration modification in the test environment, and this performance impact might be extrapolated to estimate a performance impact of implementing the modification in the production environment.

As noted above, another set of embodiments provides systems. An exemplary system in accordance with one set of embodiments comprises at least one processor and a computer readable storage medium having encoded thereon a set of instructions executable by one or more of the processor(s) to perform one or more operations. In an embodiment, the set of instructions comprises instructions for recording, in a production database in a production environment, a plurality of transactions and/or instructions for replaying the plurality of transactions in the first test database within the first test environment to produce a first test dataset. The set of instructions might further comprise instructions for replaying the plurality of transactions in the second test database within the modified test environment to produce a second test dataset, and/or instructions for estimating an impact of a configuration change in the production environment. This estimate might be based at least in part on replaying the plurality of transactions in the first test database and the second test database.

Yet another set of embodiments provide apparatus. An exemplary apparatus comprises a computer readable storage medium having encoded thereon a set of instructions executable by a computer system to perform one or more operations. Merely by way of example, the set of instructions might comprise instructions for recording, in a production database in a production environment, a plurality of transactions and/or instructions for replaying the plurality of transactions in the first test database within the first test environment to produce a first test dataset. The set of instructions might further comprise instructions for replaying the plurality of transactions in the second test database within the modified test environment to produce a second test dataset, and/or instructions for estimating an impact of a configuration change in the production environment. This estimate might be based at least in part on replaying the plurality of transactions in the first test database and the second test database.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The following description, for the purposes of explanation, sets forth numerous specific details, in order to provide a thorough understanding of the described embodiments. It will be apparent, however, to one skilled in the art, that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

In a general sense, certain embodiments provide tools and techniques for providing an assessment of a prospective configuration change in a database environment. The terms "configuration change" and "configuration modification" are used interchangeably herein, and they can include a wide variety of modifications to a database environment. Merely by way of example, configuration changes can include software configuration modifications (e.g., modification of operating parameters of the operating system, such as virtual memory swap size, disk partition size, etc.), modification of operating parameters of the RDBMS (e.g., parameters in an init.ora file (for Oracle databases) or similar files), modification of operating parameters of the enterprise application, such as (e.g., jdbc connection parameters, etc.), software upgrades (e.g., version upgrades of RDBMS software, enterprise application software, performance enhancement systems, operating systems software, and/or the like), operating system changes (e.g., from Microsoft Windows™ to Linux), hardware changes (e.g., processor upgrades, memory upgrades, etc.), implementation of performance enhancing systems (e.g., database clustering systems, etc.), and/or the like. (The term "database" is used broadly and can refer either the actual data structure that stores the data, or any program, such as an RDBMS, that manages such a data structure, or both. Accordingly, modification of a database can include either modifications of the data structure, modifications of the managing program, and/or both.)

The tools and techniques can include, without limitation, systems, methods, and software products. The tools provided by certain embodiments can record a set of one or more transactions (referred to herein as a "workload") in a production database and replay that workload in a database in a test environment and/or can measure one or more performance indicators to assess the performance of the workload in the test database. The workload may then be replayed in a modified test environment, while again measuring the performance indicator(s). These performance indicators can be compared to determine a performance impact of the modification, which can then be used to estimate a performance impact of a similar modification to the production environment.

Hence, certain of these tools and/or techniques can provide an estimate of the performance impact of a prospective configuration change to the database environment, based on a comparison of performance data gathered during the replay of the set of transactions. In this way, a user of the database environment can be assured that the proposed configuration change will not have an adverse impact on the performance of the database environment. Alternatively and/or additionally, certain embodiments can provide the ability to detect code regressions (or "bugs") in the prospective update or patch that might cause performance problems generally (and not merely on the specific database environment for which the configuration change is contemplated). As another feature of certain embodiments, these tools can be used to estimate and/or demonstrate performance enhancements that may result from the proposed configuration change. This feature can provide a valuable sales and/or marketing tool.

In addition to (or as an alternative to) merely measuring the SQL performance in the test database, the tools provided by certain embodiments can measure other performance indicators in the database environment, including without limitation database transactions per second, CPU (processor) and/or memory utilization, number of SQL code statement executed, database transactions per second, response times (e.g., goth percentile response time), memory swapping, database swaps, and/or the like. In some cases, these measurements can provide a more robust view of database performance (and overall system performance) than merely measuring SQL workload performance. Moreover, while tools (such as Oracle's Real Application Testing™ ("RAT") tool) exist to measure SQL workload performance, such tools typically do not measure performance indicators that are outside the database; certain embodiments of the invention, by contrast, are capable of measuring such "meta-indicators" and can provide an enhanced view of overall performance (including potential performance problems) than more specific SQL workload measurement tools.

Figure 1:
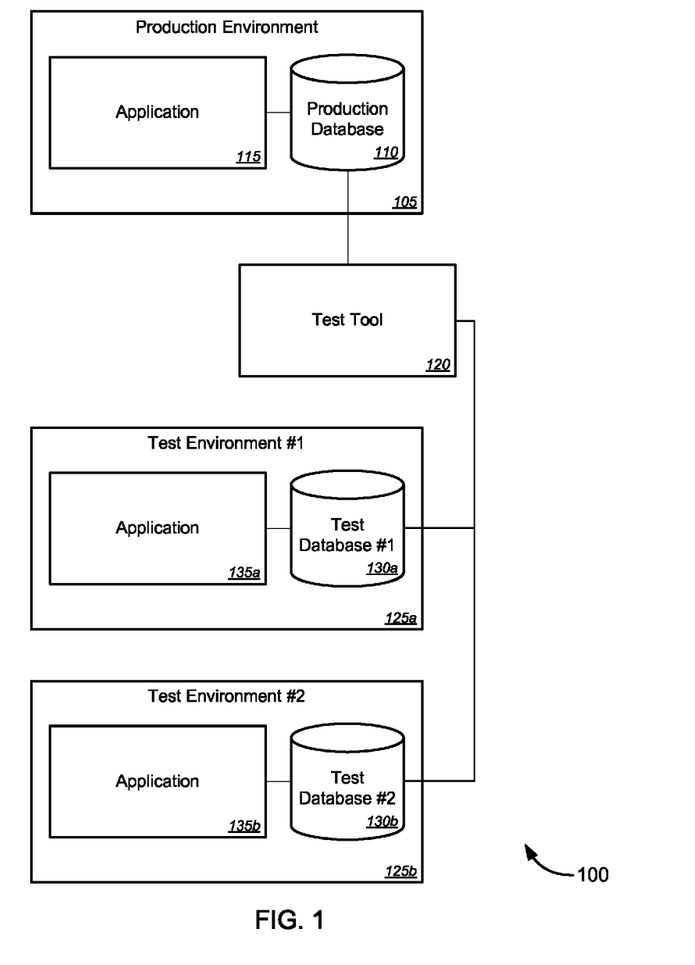
FIG. 1 is a block diagram illustrating a system for estimating an impact of a configuration change, in accordance with various embodiments.

The tools and techniques provided by certain embodiments can be used in a database environment. Merely by way of example, FIG. 1 illustrates a system 100 in accordance with one set of embodiments, while FIG. 3 (discussed below) illustrates a method 300 in accordance with another set of embodiments. As illustrated by FIG. 1, the system 100 includes a production database environment 105, comprising a production database 110 and an application 115, which may be, in some embodiments, an enterprise application. Typically, but not necessarily, a production environment (e.g., a production database environment) will be an environment that is used to support actual business operations, such that a user of the production environment may be reluctant to perform any modifications to the environment that might negatively impact performance and/or availability of the environment for business operations. A production database, then, is a database that resides in, and/or is used by, a production environment.

As used herein, the term "production environment" means any environment for which a configuration changes is contemplated, proposed and/or considered. The production environment, from one perspective, also includes an underlying hardware and/or software architecture that supports the database 110 and/or the application 115. This underlying architecture can include, without limitation, one or more computer hardware systems (examples of which are described in further detail below), perhaps communicating via a computer network, one or more operating systems, and/or one or more server applications (such as application servers, database management systems, such as an RDBMS, and/or the like). The underlying architecture (sometimes referred to herein as a "framework") can also include performance-enhancing systems, such as storage-area network systems, database clustering systems, and/or the like. It should be appreciated that the configuration of this underlying framework is discretionary and that the interaction of various components in this underlying framework therefore will not be discussed herein except to note that modifications of this framework can affect the performance of the application 115 and/or the database 110. Merely by way of example, if the production environment 105 is modified to implement a database clustering system, this modification may have a positive (or negative) impact on the performance of the application 115 and/or database 110. Similarly, of course, modification (e.g., patching, updating, etc.) the database 110 and/or the application 115 can similarly impact the performance of the application 115 and/or database 110. In an aspect, certain embodiments can help a user estimate the performance impact of any such changes.

Hence, in accordance with certain embodiments, a database environment may be implemented within an enterprise application framework, and/or the production database 110 may be used to store data generated and/or used by an enterprise application 115. Merely by way of example, the enterprise application 115 might perform, inter alia, enterprise resource planning tasks, and database 110 may be used to store data related to those enterprise resource planning tasks. In an aspect, the database 110 (and/or the application 115) performs a series of transactions in the database 110 to record and/or update data stored in the database 110, in response to actions performed in the application 115. This series of transactions (commonly referred to as a "workload") effectively creates and/or modifies a data set in the production database.

As illustrated, FIG. 1 also includes a test tool 120, as well as a first test database environment 125a and/or a second test database environment 125b. In an aspect of some embodiments, the test tool 120 is a software application (or set of applications) that executes on a computer system that implements the production environment and/or on another computer system in communication with the production environment. In some embodiments, the test tool might comprise a database application testing program (referred to herein as an "application tester"), such as Oracle's RAT, which may be supplemented as needed with additional programs or tools to provide additional functionality as described herein. The first test database environment 125a includes a first test database 130a, while the second test database environment 125b includes a second test database 130b. In some embodiments, the first test database environment 125a and second test database environment 125b include, respectively, enterprise applications 135a and 135b, although this is not required in all embodiments.

Each of the test database environments 125 includes an underlying framework, as described above. In some cases, a test environment 125 may include an underlying framework that is configured similarly to that of the production environment 105 (e.g., with a similar hardware configuration, operating system configuration, similar performance enhancing systems, etc.). However, in some cases, it is not possible (or is not economically feasible) to faithfully replicate the production environment 105 in a test environment. Hence, in accordance with some embodiments, the test environment 125 may be configured somewhat differently than the production environment 105. The nature of such embodiments allows for a configuration change to be made in the test environment 125, and the performance impact of the modification to this test environment 125 can be extrapolated (either qualitatively, quantitatively, or both) to estimate a performance impact in the production environment 105.

As indicated above, the system 100 of FIG. 1 includes both a first test environment 125a and a second test environment 125b. In certain embodiments, the difference between the first test environment 125a and the second test environment 125b corresponds to a contemplated configuration modification in the production environment 105. To illustrate, if the user contemplates modifying the production environment 105 by implementing database clustering, the first test environment 125a might not include a clustering system, while the second test environment 125b might be similar (or substantially identical) to the first test environment 125a, except that the second test environment 125b does implement a clustering system. Similarly, if the contemplated configuration modification is applying a patch to the RDBMS that manages the database 110 of the production environment 105, the first test environment 125a might include an unpatched RDBMS to manage the database 130a, while the second test environment 125b might include an RDBMS to which the contemplated patch has been applied, to manage the database 130b.

In some cases, the first test environment 125a and the second test environment 125b are separate environments (perhaps running on separate hardware systems). In other cases, there may be only one test environment—in other words, the first test environment 125a and the second test environment 125b can be the same environment. In this case, the proposed modification to the configuration of the production environment 105 is applied to the first test environment 125a to produce the second test environment 125b. Merely by way of example, in the patching example above, a test environment in an unpatched state would represent the first test environment 125a, and after applying the contemplated patch, the test environment (with the patched RDBMS) would represent the second test environment 125b. In this way, a single test system can perform the role of both the first test environment 125a and the second test environment 125b. Other possible configurations exist as well—merely by way of example, a first instance of a database might represent the first test environment 125a and a second instance of a database might represent the second test environment 125b. Alternatively and/or additionally, the production environment 110 might serve as the first test environment 125 a, and another system might provide the second test environment 125b.

Figure 2:
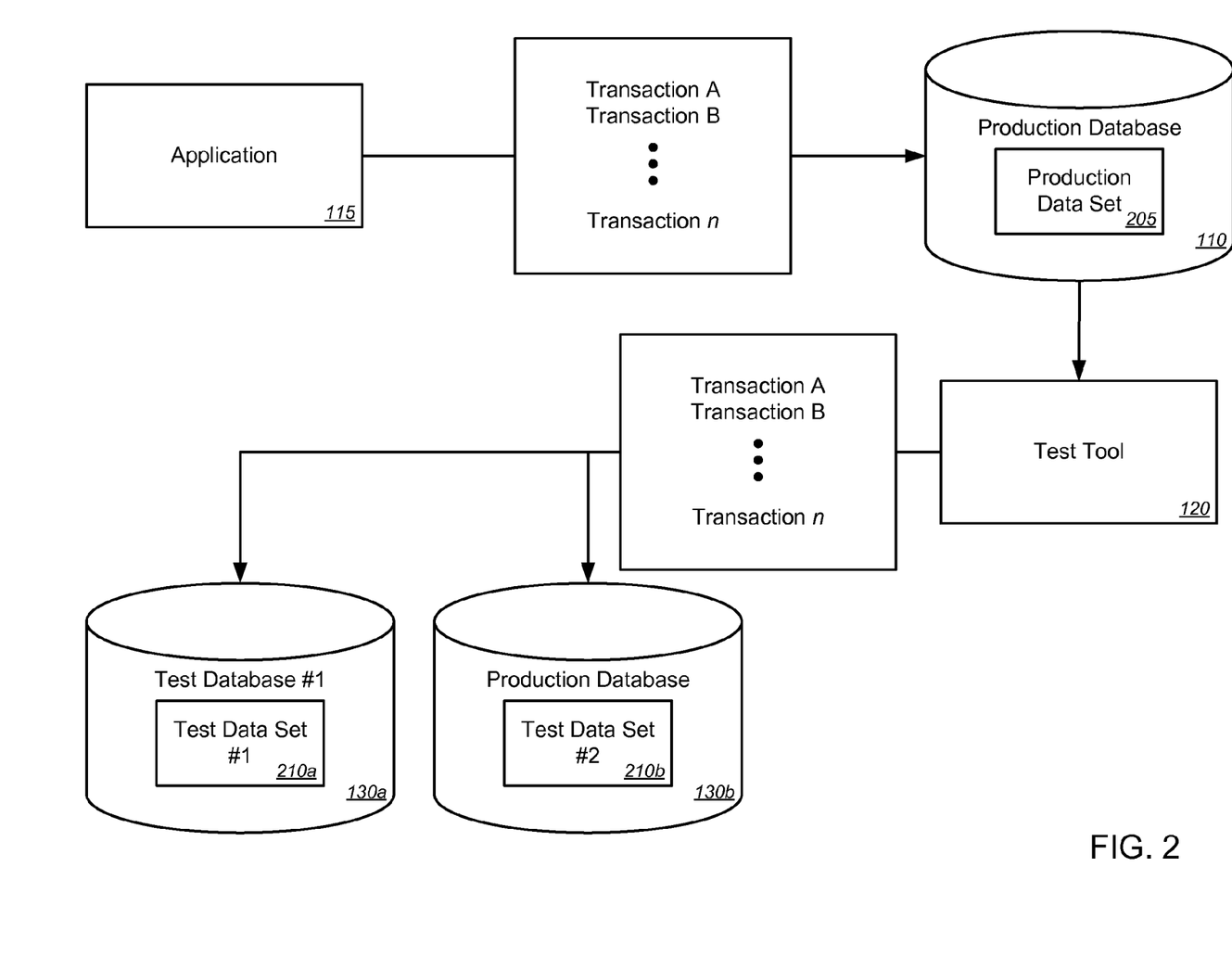
FIG. 2 is a functional diagram illustrating a system for estimating an impact of a configuration change, in accordance with various embodiments.

The operation of the system of FIG. 1, in accordance with one set of embodiments, is illustrated diagrammatically by FIG. 2. The application 115 (or any other technique) generates a set of one or more transactions (the workload) in the production database 110, creating a production data set 205. In one aspect, these transaction(s) are SQL transactions familiar to those skilled in the art, and the production data set might be, merely by way of example, a set of data records, data fields, etc. These data elements might be created anew by the transaction(s), or they might be existing data elements that are modified by the transaction(s) The test tool 120 accesses the production database 110 and records the transaction(s). As noted above, in some cases, the test tool 120 might comprise an application tester, such as Oracle RAT, which is designed to record such transactions. The operation of such an application tester should be familiar to those skilled in the art.

The test tool 120 (or a component thereof, such as the application tester) then generates (a process described herein as "replaying") the same transaction(s) in the first test database 130a, producing a first test data set 210a. The test tool 120 also replays the same transaction(s) in the second test database 130b, producing a second test data set 210b. During (or after) the replay of these transactions, one or more performance indicators may be measured. The respective performance indicators measured during the replay of the transaction(s) in the first and second test databases 210a, 210b then can be compared to determine a performance impact (in the test environment) of the configuration change. (As noted above, in some cases the production environment 105 might serve as the first test environment; in such cases, the replay of the transactions in the first test database 130a might merely represent the original transactions in the production database 110, e.g., those generated by the application 115.)

After the workload has been replayed, several procedures may be employed to assess the performance differential between the first test environment 125a and the second test environment 125b. In some cases, the performance of the SQL transactions themselves (the workload) can be measured, e.g., with an application tester. In other embodiments, other techniques may be used as well. Merely by way of example, in some cases, the first test data set 210a may be compared with the second test data set 210b to ensure that the transactions produced the same data in each test database 130.

In further embodiments, a variety of performance indicators may be compared to determine the performance impact of a proposed configuration change (as represented by the difference between the two test environments). Merely by way of example, during the replay of the workload, the tools might have measured one or more of the performance indicators described above. The respective indicators measured in each test environment can be compared qualitatively to determine whether the modification of the test environment (i.e., the difference between the first test environment 125a and the second test environment 125b) created a positive, neutral, or negative performance impact on the test environment. In some cases, the performance impact may be quantified (i.e., the difference in percentage of CPU utilization, the difference in $90^{th}$ percentile response time, etc.). This information can then be used to estimate a performance impact on the production system that might result from modifying the production environment 105 in similar fashion.

Figure 3:
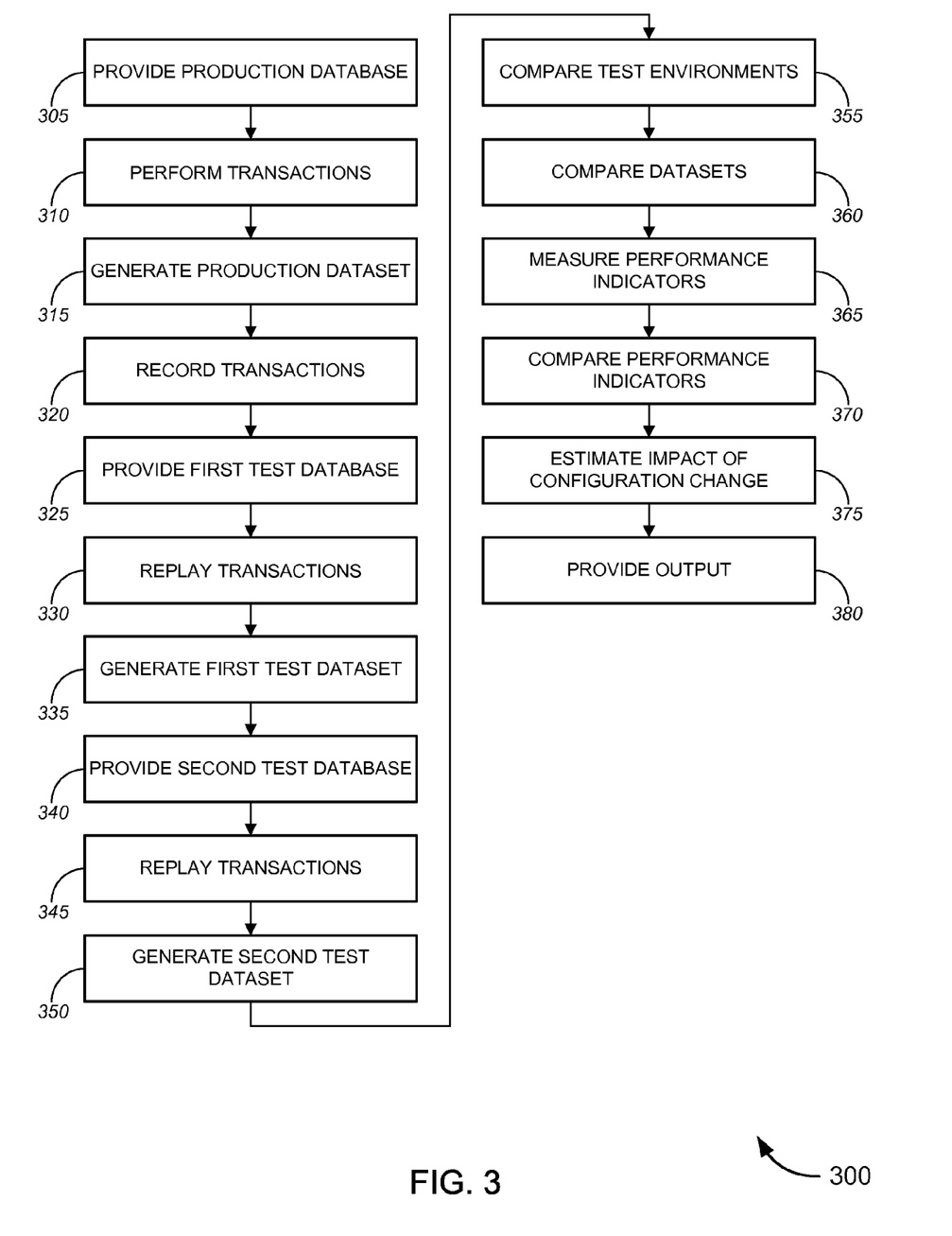
FIG. 3 is a process flow diagram illustrating a method of estimating an impact of a configuration change, in accordance with various embodiments.

FIG. 3 illustrates a method 300 that can be used to estimate a performance impact of a proposed modification to a configuration of a database environment. While the methods illustrated by FIG. 3 can be implemented by (and, in some cases, are described below with respect to) the system 100 of FIG. 1 (or components thereof), these methods can be implemented using any suitable hardware implementation. Similarly, while the system 100 of FIG. 1 (and/or components thereof) can operate according to the method illustrated by FIG. 3 (e.g., by executing instructions embodied on a computer readable medium), the system 100 can also operate according to other modes of operation and/or perform other suitable procedures.

The method 300 of FIG. 3 comprises providing a production database in a production environment (block 305). Providing a production database may comprise any of a variety of procedures, including without limitation selling a production database, installing a production database, maintaining a production database, using a production database (e.g., to support business operations), supporting a production database and/or environment, and/or the like. From this disclosure, one skilled in the art will appreciate that a wide variety of operations may be considered to be providing a production database.

The method 300 further comprises performing one or more transactions in the production database (block 310). As noted above, in some embodiments, a database transaction might comprise a SQL transaction (e.g., execution of one or more lines of SQL code), and/or a database transaction may be performed by an enterprise application (when this document refers to an enterprise application as "performing" a transaction in a database, that term encompasses any situation in which a transaction is performed in a database in response to input from such an application; in some cases, for example, an RDBMS might perform the transaction at the request of an enterprise application—this activity would be considered to be the enterprise application performing the transaction). Also as noted above, a set of one or more database transactions may result in the generation of a data set (block 315). (This document uses the term "generate," with respect to a data set, to refer to the creation, modification, deletion, or manipulation of any data elements within a database.) This data set, because it resides in a production database, is referred to as a "production data set."

In a set of embodiments, the method comprises recording the performed transactions (in the production data set) (block 320). In some embodiments, an application tester, such as Oracle's RAT, can be used to record these transactions. In other embodiments, any tool or technique that makes a record of a set of database transactions (for example, in order to allow a substantially identical set of transactions to be performed in another database) may be used.

In accordance with some embodiments, the method 300 further comprises providing a first test database in a first test environment (block 325). Providing a test database can include, inter alia, any of the procedures described above with respect to providing a production database. In some cases, the test database (and/or the test database environment) may be configured similarly, at least in some respects, to the production database and/or environment. Merely by way of example, even if the underlying framework of the test environment differs from that of the production environment, the first test database itself may be configured similarly to the production database; for instance, the first test database might have a similar table structure, a similar data load, a similar RDBMS version and/or patch level, etc. Hence, providing a test database can comprise configuring a test database similarly to the production database. In other embodiments, as noted above, the production database can serve as the first test database, so that providing the first test database might merely comprise providing the production database.

At block 330, the method 300 comprises replaying one or more of the recorded transactions in first the test database. As used herein, the term "replaying" means performing in the test database the same transactions that were recorded in the production database. Typically, performing the transactions will comprise executing one or more SQL statements that effectuate the transaction(s). In some cases the tool that was used to record the transactions (e.g., Oracle RAT) can be used to replay the transactions in the first test database. The replay of these transactions generates a first test dataset in the first test database (block 335), similar to the way in which the performance of the transactions in the production database generates the product dataset. It should be noted that, in cases in which the production database serves as the first test database, this replaying operation may be unnecessary, since the original performance of the transactions may suffice for purposes of estimating a performance impact of a configuration change to the production database environment.

The method 300, in a set of embodiments, further comprises providing a second test database in a second test environment (block 340). As noted above, in some cases, the second test database is merely the first test database after a configuration change is performed. Hence, in a set of embodiments, providing a second test database might comprise performing, in the first test database environment, a configuration change that is proposed or contemplated for the production database environment. Additionally and/or alternatively, providing the second test database might comprise resetting the data in the first test database to an original state (e.g., undoing the transactions replayed in the first test database, replacing the data in the database with fresh data, and/or reinstalling the database) so as to provide a consistent test environment for the replay of the transactions.

In other cases, however, the second test environment might be a separate environment from the first test environment. Accordingly, providing the second test environment can comprise procedures similar to those used to provide the test environment, although providing the second test environment often will also include performing whatever configuration modification (e.g., software patch, hardware and/or software upgrade, etc.) is contemplated for the production environment.

In either case, the second test environment generally will replicate the first test environment, except that the second test environment will include the configuration change that is being considered for the production environment. Hence, the second test environment can be considered a "modified" test environment. The method 300, then, may include replaying the set of transactions in second database (which is part of the modified test environment) (block 345) to generate a second test dataset (block 350), similar to the replay of the transactions in the first test database. As noted above, replaying the transactions might comprise execution of one or more SQL statements; depending on the nature of the configuration modification, the SQL statements executed when replaying the transactions might differ from those executed when replaying the transactions in the first test database; this difference can be a point of comparison when analyzing the respective performance of the first and second test environments.

After the transactions have been replayed in the first test database and/or the second test database, the results of replaying the transactions may be analyzed in order to estimate a performance impact of the proposed configuration change to the production environment. This analysis can include a variety of procedures. Merely by way of example, in some cases, the method 300 includes comparing the test environments (block 355). One technique for comparing the first test environment (or the production environment if there is no separate first test environment) with the modified test environment is to compare the performance of the SQL code performing the same transactions in each environment (and/or comparing the SQL statements executed during the replay of the transactions in the first and second test databases). An application tester, such as Oracle RAT, can be used to quantify the performance of the transactions in each environment and, and these quantified results may be compared. Another technique is to compare the SQL statements that were actually executed during performance of the transactions in the first and second test databases, respectively, to ensure that the substantially the same (or equivalent) transactions were performed.

Additionally and/or alternatively, the second test dataset may be compared with the first test dataset (and/or the production dataset) to ensure that they are consistent. Any inconsistencies might indicate that the modified configuration of the second test environment caused the transactions to generate improper data. This condition, in turn, might indicate that the proposed modification to the production environment would introduce a bug that might affect the reliability of the data stored in the production database.

In other cases, the method 300 might include measuring one or more performance indicators (including without limitation those described above) during the performance of the transactions in the production database and/or the replay of those transactions in the test database(s) (block 365). Merely by way of example, the method 300 might include measuring a first set of performance indicators associated with the replay of the set of transactions in the first database; for instance, the CPU utilization, database swaps, and/or the like in the first test environment might be measured and recorded while the transactions are being performed in the first test database. The tools provided by certain embodiments include functions for measuring and/or recording such performance indicators. The method 300 might further include measuring and/or recording such indicators in the modified test environment during replay of the transactions in the second test database.

These respective performance indicators can be compared (block 370). Merely by way of example, the CPU utilization recorded in the modified test environment during the replay of the transactions in the second test database can be compared with the CPU utilization recorded in the first test environment during replay of the transactions in the first test environment. This comparison can provide insight into the relative performance of the modified test environment as compared with the original test environment, using actual workload from the production environment.

At block 375, the method 300 comprises estimating the impact of performing the configuration change in the production environment. This estimate can be based on any one or more of the factors described above, including without limitation, SQL workload performance, the datasets that were generated by the workload in the test databases, and/or a comparison of any measured performance indicators. Merely by way of example, if the modified test environment showed a substantial decrease in SQL transaction performance compared with the first test environment, it might be estimated that the production environment would suffer a similar performance penalty if its configuration were modified in similar fashion. Similarly, if the CPU utilization and/or memory utilization/swaps was much higher in the modified test environment during replay of the transactions than were the same indicators in the first test environment, that might indicate that production environment would see similarly heavier resource usage if the configuration of that environment were modified.

This estimate can be useful for a variety of purposes. First, if the testing indicates that performance will suffer (and/or that resources such as CPU and memory will be more heavily taxed) if the configuration is changed, this might provide guidance as to whether the configuration should be modified at all. By performing these tests in the test environment, the user can avoid learning these difficult lessons through real-world experience. Secondly, even if the user decides to perform the configuration modification in the production environment, the testing might provide valuable guidance that the hardware resources of the production system need to be upgraded to provide similar performance if the configuration is modified in the contemplated manner. Third, the tools provided by various embodiments can be used iteratively to test multiple combinations of configuration changes (such as upgrading an RDBMS version, implementing database clustering, and adding memory to the production system) to find an optimal modification of the production environment's configuration.

Additionally, if the testing indicates that performance will improve of the configuration of the production system is modified, this can provide a valuable sales and marketing tool. Merely by way of example, an application or database vendor (or a software-as-a-service provider) can offer to test the a customer's workload in a test environment as a way to demonstrate to the customer that a new version of the software will provide tangible performance benefits. In some cases, the performance benefits may be extrapolated from the test system to the customer's production system. For example, in the test environment, implementation of database clustering may improve transaction response times by 30%, and, if the test environment is properly configured to emulate the customer's production environment, the vendor may be able to assure the customer that similar performance gains will result from implementation of clustering in the customer's system.

In other cases, certain embodiments may be able to identify code regressions ("bugs") in a software patch or upgrade by identifying serious performance degradations in the test environment after the configuration is modified. This feature can be beneficial because it can allow the software vendor to identify such regressions before releasing a patch or a new version to customers, thus avoiding customer dissatisfaction and/or product returns.

At block 380, the method 300 comprises providing an output. Providing an output can comprise displaying output on a monitor, printing output on a printer, providing output via a web page and/or electronic message, and/or the like. In some cases, the output might merely comprise an indication that the proposed configuration change is likely to have a positive, negative, or neutral (as appropriate) performance impact on the production system. In other cases, the output might include an estimated quantification of the performance change that will result from the configuration modification. In yet other cases, the output might include any measured performance indicators, any differences in the generated datasets, and/or the like.

Figure 4:
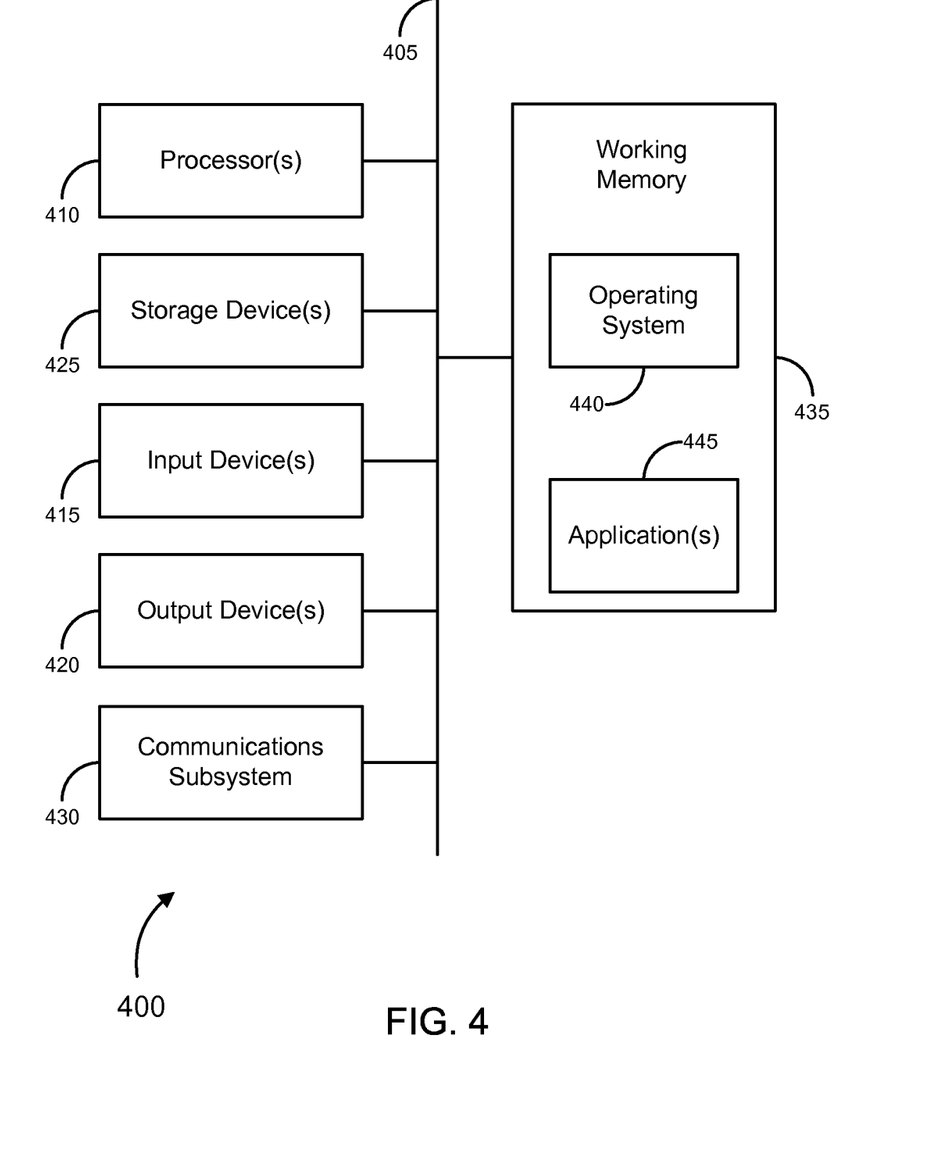
FIG. 4 is a generalized schematic diagram illustrating a computer system, in accordance with various embodiments of the invention.

FIG. 4 provides a schematic illustration of one embodiment of a computer system 400 that can perform the methods provided by various other embodiments, as described herein, and/or can function as an underlying framework for a database environment. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless and/or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as being currently located within the working memory 435, including without limitation an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, but are not limited to, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
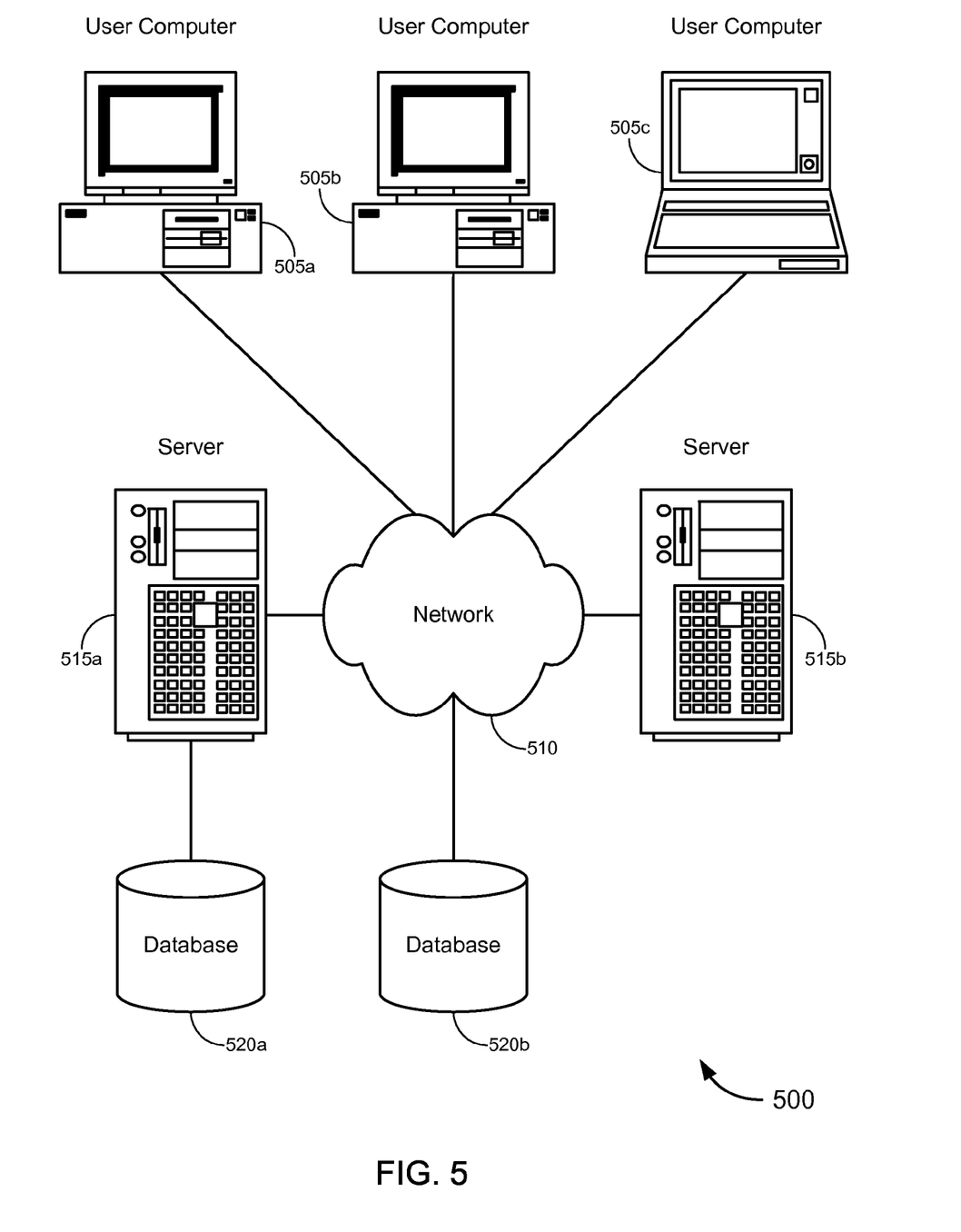
FIG. 5 is a block diagram illustrating a networked system of computers, which can be used in accordance with various embodiments of the invention.

A set of embodiments comprises systems for estimating a performance impact to a configuration change in a database environment Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods provided by various embodiments (as described above, for example), as well as one or more office applications, database client and/or server applications, and/or web browser applications. Alternatively, the user computers 505 can be any other electronic device, such as a thin-client computer, Internet-enabled mobile telephone, and/or personal digital assistant, capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more application servers, which can be configured with one or more applications (e.g., business or enterprise applications) accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 505 and/or another server 515. In some embodiments, an application server can create web pages dynamically for displaying the information in accordance with various embodiments, such as displaying output from a test tool. Data provided by an application server may be formatted as one or more web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 535 can be a relational database, such as an Oracle database, that is adapted to store, update, and retrieve data in response to SQL-formatted commands. The database might be controlled and/or maintained by an RDBMS on a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A computer-implemented method for estimating an impact of a software patch in a database environment, comprising:
   under the control of one or more computer systems configured with executable instructions,
      providing a production database in a production environment;
      performing, with an enterprise application, a plurality of transactions to generate a production dataset in the production database;
      recording, in the production database, the plurality of transactions with a database application testing program;
      providing a first test database in a first test environment, the first test environment having a configuration similar to the production environment;
      replaying the plurality of transactions in the first test database within the first test environment to produce a first test dataset;
      measuring a first set of one or more performance indicators associated with replaying the plurality of transactions in the first test database, the first set of one or more performance indicators comprising at least one performance indicator other than structured query language ("SQL") performance;
      providing a second test database in a modified test environment, the modified test environment having been modified from the first test environment by applying a software patch to at least one component of the first test environment;
      replaying the plurality of transactions in the second test database within the modified test environment to produce a second test dataset;
      measuring a second set of one or more performance indicators associated with replaying the plurality of transactions in the second test database, the second set of one or more performance indicators comprising at least one performance indicator other than SQL performance;
      comparing one or performance indicators in the first set of performance indicators with one or more performance indicators in the second set of performance indicators; and
      estimating an impact of applying the software patch to the production environment based at least in part on replaying the plurality of transactions in the first test database and the second test database and on a comparison of one or more performance indicators in the first set of performance indicators with one or more performance indicators in the second set of performance indicators.

2. A computer-implemented method for estimating an impact of a configuration change in a database environment, comprising:
   under the control of one or more computer systems configured with executable instructions,
      recording, in a first database, a plurality of transactions;
      replaying the plurality of transactions in at least one test database;
      measuring at least one set of one or more performance indicators associated with replaying the plurality of transactions in the at least one test database, each set of one or more performance indicators comprising at least one performance indicator other than structured query language ("SQL") performance; and
      estimating an impact of a configuration change in a production database environment based at least in part on the at least one set of one or more performance indicators.

3. The computer-implemented method of claim 2, wherein:
   the at least one test database is a plurality of test databases comprising a first test database and a second test database;
   replaying the plurality of transactions comprises replaying the plurality of transactions in the first test database and replaying the plurality of transactions in the second test database;
   measuring at least one set of one or more performance indicators comprises measuring a first set of one or more performance indicators associated with replaying the plurality of transactions in the first test database and measuring a second set of one or more performance indicators associated with replaying the plurality of transactions in the second test database; and
   estimating an impact of a configuration change in a production database comprises comparing one or more performance indicators in the first set of performance indicators with one or more performance indicators in the second set of performance indicators.

4. The computer-implemented method of claim 2, wherein the production database environment comprises the first database.

5. A computer-implemented method for estimating an impact of a configuration change in a database environment, comprising:
   under the control of one or more computer systems configured with executable instructions, recording, in a production database in a production environment, a plurality of transactions;
providing a first test database in a first test environment;
replaying the plurality of transactions in the first test database within the first test environment to produce a first test dataset;
providing a second test database in a modified test environment at least by modifying a configuration of the first test environment to model the configuration change in the production environment;
replaying the plurality of transactions in the second test database within the modified test environment to produce a second test dataset; and
estimating an impact of a configuration change in the production environment based at least in part on replaying the plurality of transactions in the first test database and the second test database.

6. The computer-implemented method of claim 5, further comprising providing an output to a user, the output indicating an estimate of the impact of the configuration change in the production environment.

7. The computer-implemented method of claim 5, wherein the first test database and the second test database are the same database.

8. The computer-implemented method of claim 5, wherein modifying a configuration of the first test environment comprises modifying a relational database management system that manages the first test database.

9. The computer-implemented method of claim 8, wherein modifying a relational database management system comprises upgrading the relational database management system from an older version to a newer version.

10. The computer-implemented method of claim 8, wherein modifying a relational database management system comprises modifying one or more operating parameters of the relational database management system.

11. The computer-implemented method of claim 8, wherein modifying a relational database management system comprises implementing the relational database management system in a clustered configuration.

12. The computer-implemented method of claim 5, wherein modifying a configuration of the first test environment comprises modifying an operating system of a computer system on which the first test database is located.

13. The computer-implemented method of claim 5, wherein modifying a configuration of the first test environment comprises modifying a hardware configuration of a computer system on which the first test database is located.

14. The computer-implemented method of claim 5, wherein modifying a configuration of the first test environment comprises modifying an enterprise application that is operable to store data in the first test database.

15. The computer-implemented method of claim 5, further comprising:
measuring a first set of one or more performance indicators associated with replaying the plurality of transactions in the first test database; and
measuring a second set of one or more performance indicators associated with replaying the plurality of transactions in the second test database.

16. The computer-implemented method of claim 15, wherein estimating an impact of a configuration change in the production environment comprises comparing one or more performance indicators in the first set of one or more performance indicators with a corresponding one or more indicators in the second set of one or more performance indicators.

17. The computer-implemented method of claim 15, wherein the first set of one or more performance indicators and the second set of one or more performance indicators each comprising at least one of transactions per second, processor utilization, memory usage, memory swapping, or number of structured query language code executions.

18. The computer-implemented method of claim 5, wherein:
replaying the plurality of transactions in the first test database comprises executing a first set of one or more SQL statements;
replaying the plurality of transactions in the second test database comprises executing a second set of one or more SQL statements; and
estimating an impact of a configuration change in the production environment comprises comparing one or more SQL statements in the first set of one or more SQL statements with one or more SQL statements in the second set of one or more SQL statements.

19. The computer-implemented method of claim 15, wherein estimating an impact of a configuration change in the production environment comprises comparing at least a portion of the first test dataset in the first test database with at least a portion of the second test dataset in the second test database.

20. The computer-implemented method of claim 5, wherein recording a plurality of transactions comprises recording the plurality of transactions using a database application testing program.

21. The computer-implemented method of claim 20, wherein replaying the plurality of transactions comprises replaying the plurality of transactions using the database application testing program.

22. A computer system for measuring an impact of a configuration change in a database environment, comprising:
one or more processors; and
memory, including instructions executable by the one or more processors to cause the computer system to at least:
record, in a production database in a production environment, a plurality of transactions;
replay the plurality of transactions in the first test database within the first test environment to produce a first test dataset;
replay the plurality of transactions in the second test database within the modified test environment to produce a second test dataset; and
estimate an impact of a configuration change in the production environment based at least in part on replaying the plurality of transactions in the first test database and the second test database.

23. One or more non-transitory computer readable storage media having stored thereon executable instructions that, when executed by one or more processors of a computer system, enable the computer system to at least:
record, in a production database in a production environment, a plurality of transactions;
replay the plurality of transactions in the first test database within the first test environment to produce a first test dataset;
replay the plurality of transactions in the second test database within the modified test environment to produce a second test dataset; and
estimate an impact of a configuration change in the production environment based at least in part on replaying the plurality of transactions in the first test database and the second test database.

* * * * *

UNITED STATES PATENT AND TRADEMARK OFFICE
CERTIFICATE OF CORRECTION

PATENT NO. : 8,418,150 B2  
APPLICATION NO. : 12/417938  
DATED : April 9, 2013  
INVENTOR(S) : Thirumalai et al.

Page 1 of 1

It is certified that error appears in the above-identified patent and that said Letters Patent is hereby corrected as shown below:

On Title page, in column 2, under "Other Publications", line 1, delete "Databse" and insert -- Database --, therefor.

On Title page 2, in column 1, under "Other Publications", line 13, delete "developmen" and insert -- development --, therefor.

On Title page 2, in column 2, under "Other Publications", line 6, delete "Performace" and insert -- Performance --, therefor.

In the Specification:

In column 4, line 3, after "indicators" insert -- . --.

In column 7, line 30, delete "goth" and insert -- $90^{th}$ --, therefor.

In column 14, line 11, after "the" delete "a".

In column 15, line 45, delete "and or" and insert -- and/or --, therefor.

In the Claims:

In column 20, line 10, in Claim 1, after "or" insert -- more --.

Signed and Sealed this  
Sixth Day of August, 2013

Teresa Stanek Rea  
*Acting Director of the United States Patent and Trademark Office*